US006186458B1

(12) United States Patent
Hansen

(10) Patent No.: US 6,186,458 B1
(45) Date of Patent: Feb. 13, 2001

(54) SUPPORT ARM

(76) Inventor: Henning Hansen, 1470 Highbush Trail, Pickering (CA), L1V 1N5

( * ) Notice: Under 35 U.S.C. 154(b), the term of this patent shall be extended for 0 days.

(21) Appl. No.: 09/515,939

(22) Filed: Feb. 29, 2000

Related U.S. Application Data

(63) Continuation of application No. PCT/CA98/00833, filed on Sep. 2, 1998.

(30) Foreign Application Priority Data

Sep. 2, 1997 (CA) .................................................. 2214549

(51) Int. Cl.⁷ .................................................... E04G 3/00
(52) U.S. Cl. .................................. 248/274.1; 248/276.1; 248/280.11; 248/281.11; 248/284.1; 248/292.11; 248/325; 74/490.1; 74/490.02; 74/490.5
(58) Field of Search ............................. 248/274.1, 276.1, 248/280.11, 281.11, 284.1, 292.11, 325; 74/490.01, 490.02, 490.03, 490.05

(56) References Cited

U.S. PATENT DOCUMENTS

| | | | |
|---|---|---|---|
| 3,160,379 | 12/1964 | Gardella | 248/124 |
| 4,166,602 | * 9/1979 | Nilsen et al. | 248/280.1 |
| 4,863,133 | * 9/1989 | Bonnell | 248/278 |
| 4,881,709 | * 11/1989 | Nakamura | 248/281.1 |
| 5,014,693 | * 5/1991 | Wright, II et al. | 128/204.18 |
| 5,060,532 | * 10/1991 | Barker | 74/479 |
| 5,527,217 | 6/1996 | Engstrom | 454/63 |
| 5,597,146 | * 1/1997 | Putman | 248/276.1 |
| 5,609,316 | * 3/1997 | Tigliev | 248/123.11 |
| 5,813,286 | 9/1998 | Hansen | 74/490.02 |
| 6,050,530 | * 4/2000 | Nakamura | 248/123.2 |

FOREIGN PATENT DOCUMENTS

| | | |
|---|---|---|
| 1179070 | 10/1964 | (DE) . |
| 0507999 | 10/1992 | (EP) . |
| 92/14561 | 9/1992 | (WO) . |

* cited by examiner

Primary Examiner—Leslie A. Braun
Assistant Examiner—A. Joseph Wujciak
(74) Attorney, Agent, or Firm—Ridout & Maybee

(57) ABSTRACT

A support arm has a support structure and an arm structure connected to the support structure through a pivotal connection for pivoting about a horizontal axis. A device is provided for adjusting the elevation of the arm structure by pivoting it about the horizontal axis. A support base is connected to the arm structure through a pivotal connection for pivoting relative to the arm structure about an axis that is parallel to the horizontal axis. A support member is connected to the support base through a pivotal connection for pivoting about a vertical pivot axis, and auxiliary structure such as an air extraction arm may be connected to the support member. A linkage between the support base and the support structure maintains the pivot axis of the support base parallel to a vertical axis as the elevation of the arm structure is adjusted, and avoids the auxiliary structure from swinging under the influence of gravity to a neutral position different from that desired by an operator.

8 Claims, 3 Drawing Sheets

SUPPORT ARM

This application is a continuation of International patent application No. PCT/CA98/00833 filed Sep. 2, 1998.

The present invention relates to a support arm. Applicant's U.S. Pat. No. 5,813,286 issued Sep. 29, 1998 discloses a support arm having an arm structure that is pivotable about a horizontal axis between raised and lowered positions. While this support arm has great utility especially in welding applications, its capabilities and versatility are not as great as may be considered desirable.

In the present invention, it has been found that the capabilities and versatility of the arm can be greatly extended by providing the arm with a support base having a pivot axis that is maintained parallel to a vertical axis as the elevation of the arm structure is adjusted.

The present invention provides a support arm comprising a support structure, an arm structure connected to the support structure through a pivotal connection for pivoting about a horizontal axis, means for adjusting the elevation of the arm structure by pivoting it about the horizontal axis, a support base connected to the arm structure through a pivotal connection for pivoting relative to the arm structure about an axis parallel to said horizontal axis, a support member connected to the support base through a pivotal connection for pivoting about a pivot axis parallel to a vertical axis, and a linkage between the support base and the support structure maintaining the pivot axis of the support base parallel to a vertical axis as the elevation of the arm structure is adjusted.

The support member may support various auxiliary structures, for example a tool tray, air or vacuum hoses, welding guns, suction hoses or suction arms that pivot in a radius about the support base. When the arm structure is raised or lowered, the vertical pivot connection remains parallel to the vertical axis and avoids any tendency for the auxiliary structure to swing under the influence of gravity to a neutral position different from that desired by the operator.

The linkage between the support base and the support structure may comprise a parallelogram linkage.

The invention is more fully described with reference to the accompanying drawings, by way of example only.

Figure 1:
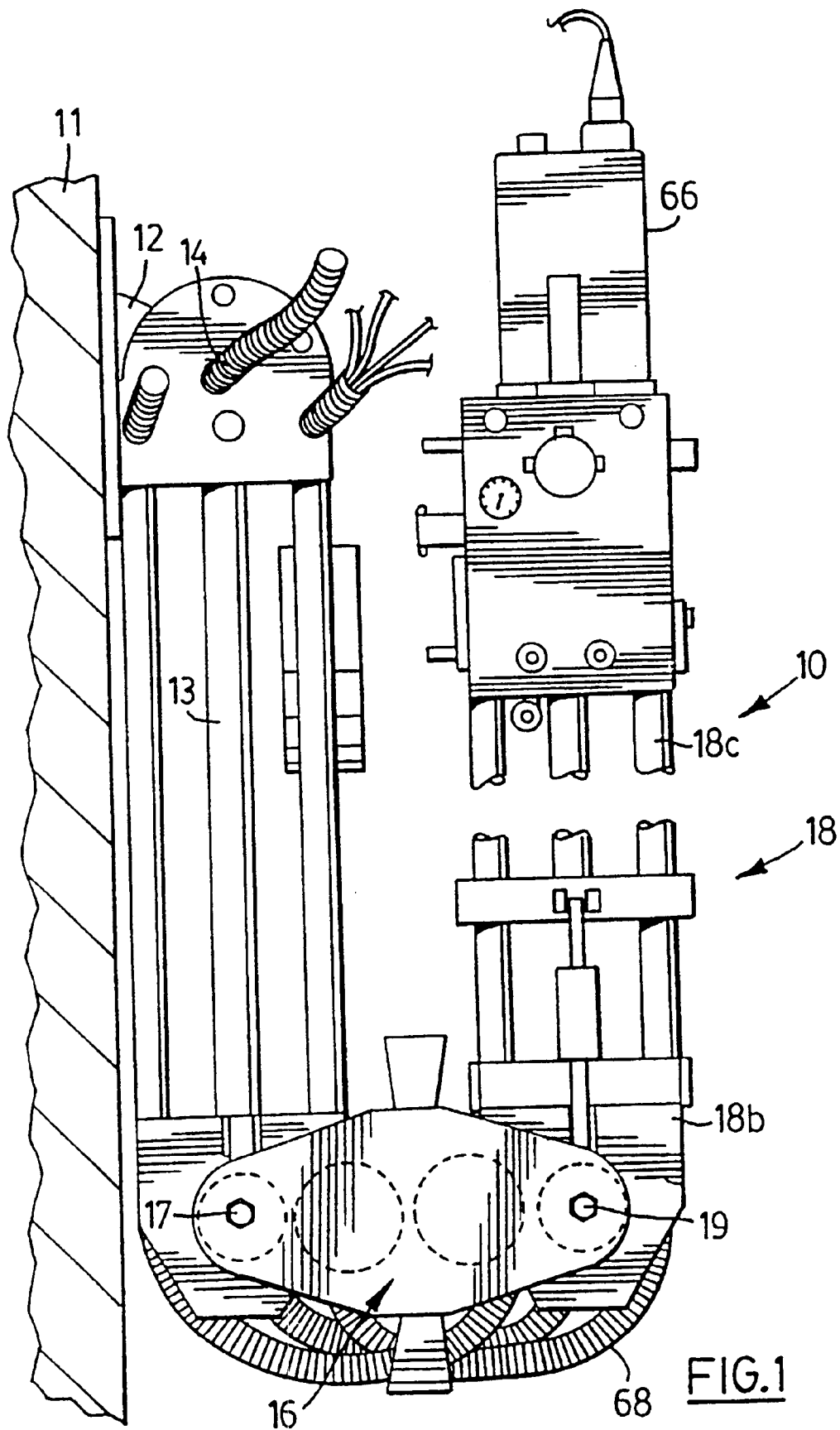
FIG. 1 is a bottom plan view of a support arm in folded configuration.

Referring to the drawings, the elements and functioning of the arm as seen in FIG. 1 are described in more detail in applicant's above-mentioned U.S. Pat. No. 5,813,286 which should be referred to for further details. Briefly, an arm 10 is mounted on a vertical support surface such as a wall 11. In the preferred form, as shown, the arm comprises a support structure comprising a mounting bracket 12 secured to the wall, a boom 13 pivotally connected to the bracket 12 at 14 to pivot about a vertical axis, a knuckle 16 pivoted to the boom 13 at 17, and an auxiliary jib portion 18b pivoted to the knuckle 16 at 19. The pivots 17 and 19 pivot about parallel vertical axes. The boom 18 further comprises a main jib section 18c hinged to the auxiliary section 18b at a pivot connection 56 for pivoting about a horizontal axis. A cylinder 59 and a piston 62 working in the cylinder 59 and connected between the auxiliary jib section 18b and the main section 18c are operable to rotate the main section 18c about the horizontal axis 56 to adjust the elevation of the arm structure 18c.

A functional head, for example, a welding and welding control apparatus 66, may be supported on an outer end of the arm structure 18c and may be connected to, for example, a rectangular plate 67 secured to rigid tubes forming part of the arm structure 18c. Flexible hoses 68 may interconnect between these tubes and further rigid tubes constituting the boom 13 to provide a fluid pathway between the functional head 66 and the rear end of the boom 13 adjacent the wall structure 11.

Figure 2:
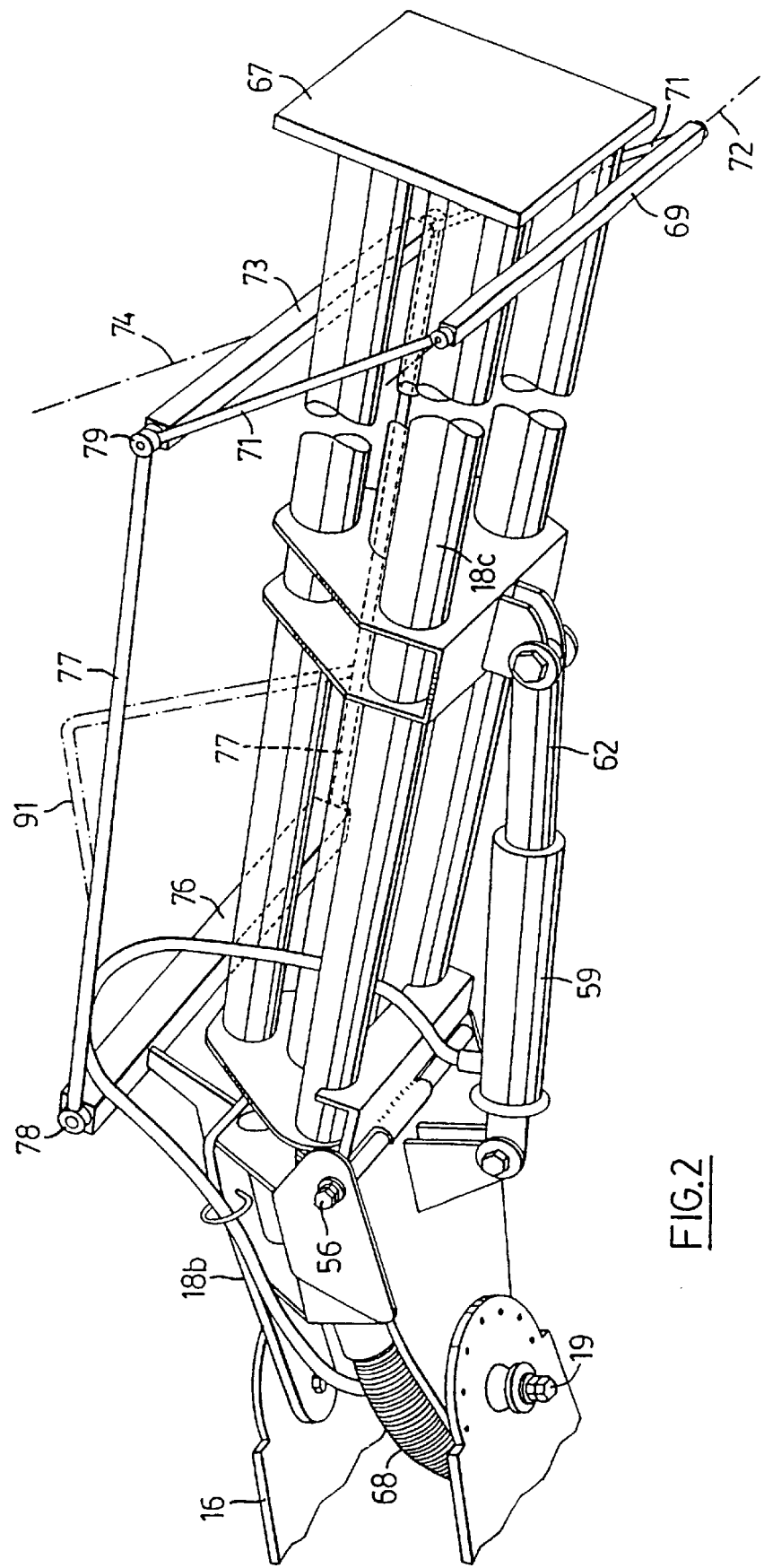
FIG. 2 is a partial perspective view from underneath of a portion of the arm showing structure in accordance with the invention.
Figure 3:
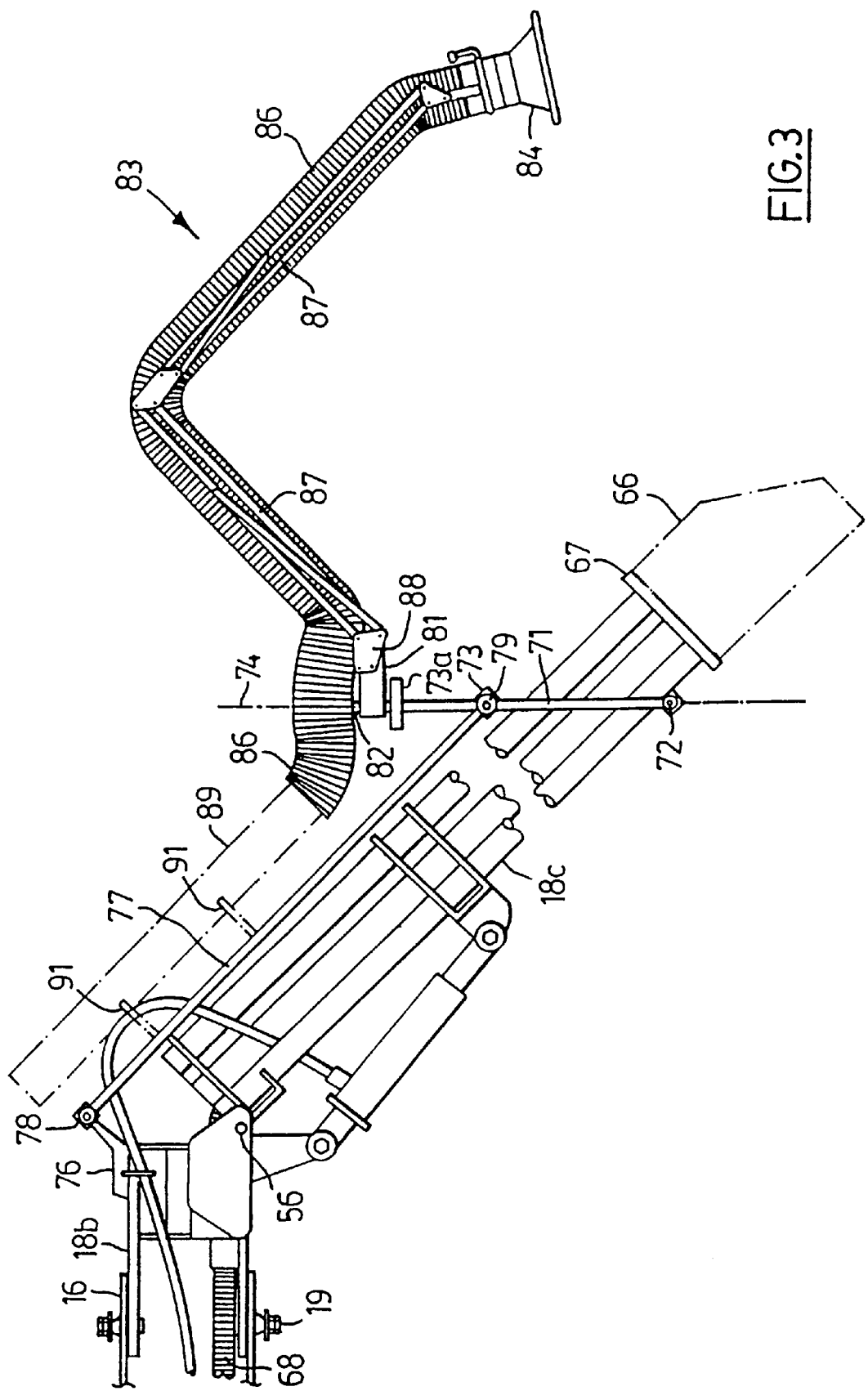
FIG. 3 is a side view showing one form of auxiliary structure mounted on the support arm of FIG. 2.

As illustrated somewhat schematically in FIGS. 2 and 3, a supporting piece 69 extends transversely and is secured to a lower portion of the arm structure 18c adjacent the functional head 66. An arm 71 is pivotally connected at each end of the supporting piece 69 for pivoting about a horizontal axis 72 passing through piece 69. The upper end of each arm 71 is secured to a crosspiece 73 parallel to piece 69 and rigidly connected to a support base 73a, seen in FIG. 3.

A linkage is provided between the support base 73a and the support structure 18b in order to align the support base 73a parallel to a vertical axis 74 as the elevation of the arm structure 18c is adjusted upwardly and downwardly relative to structure 18b.

In the example shown, the linkage comprises a parallelogram linkage. The linkage comprises a connection member 76 secured on the upper side of the auxiliary jib structure 18b and a connection rod 77 extending parallel to arm structure 18c and connected at each side to the connection member 76 through a pivotal connection allowing pivoting about a horizontal axis 78. At the opposite end, each connection rod 77 is connected to a respective side of the cross-piece 73 that supports the support base 73a through a pivotal connection likewise allowing pivoting between the rod 77 and cross-piece 73 about a horizontal axis 79. A support member, for example a swivel arm 81, is connected to the support base 73a through a pivotal connection 82 for pivoting the arm 81 relative to the base 73a about the vertical axis 74.

With this arrangement, as the arm structure 18c rises and falls relative to the support structure 18b, the axis 74 is maintained parallel to the vertical.

Other forms of linkage may be used between the support base 73a and the support structure 18b for maintaining the axis 74 vertical, for example coupled hydraulic cylinders and the like.

In the example illustrated, an auxiliary structure comprising a low pressure high volume air extraction arm 83 is secured to the swivel arm 81. The arm 83 comprises an extraction head 84 connected to a flexible large diameter hose 86, the hose 86 and head 84 being supported through adjustable linkage apparatus 87 connected to a base 88 secured to the arm 81. Extraction arms such as arm 83 are in themselves well known, and are available, for example, Dansk Klimablock A/G, Denmark, from Lincoln Electric of Cleveland, Ohio, and others.

With the arrangement of the invention, the extraction head 84 can be positioned by the operator in any desired radial position relative to the vertical axis 74, regardless of the angle of inclination of the arm structure 18c, without the arm 83 and head 84 tending to swing under the influence of gravity to a lower or neutral position.

Other auxiliary structures, for example air or vacuum hoses, welding guns or suction hoses may likewise be pivoted on an arm 81 pivotally connected to the support base 73.

Rearwardly of the arm 81, the flexible conduit 86 may be connected to a service conduit, for example a rigid fluid conduit 89 supported on support brackets 91 rigidly connected at their lower ends on the rods 77. Rearwardly, the conduit 89 may be connected through a flexible conduit and rigid conduit supported on the knuckle 16 and on the jib structure 13, respectively.

What is claimed is:

1. A support arm comprising a support structure, an arm structure connected to the support structure through a pivotal connection for pivoting about a horizontal axis, means for adjusting the elevation of the arm structure by pivoting it about the horizontal axis, a support base connected to the arm structure through a pivotal connection for pivoting relative to the arm structure about an axis parallel to said horizontal axis, a support member connected to the support base through a pivotal connection for pivoting about a pivot axis parallel to a vertical axis, and a linkage between the support member and the support structure maintaining the pivot axis of the support base parallel to a vertical axis as the elevation of the arm structure is adjusted.

2. A support arm as claimed in claim 1 wherein the linkage comprises a parallelogram linkage.

3. A support arm as claimed in claim 2 wherein said linkage comprises a pair of arms connecting between said arm structure and the support base and a pair of rods connecting between the support base and the support structure.

4. A support arm as claimed in claim 3 comprising a service conduit supported on said pair of rods and connecting to an auxiliary support structure connected to said support member.

5. A support arm as claimed in claim 1 having a welding control apparatus connected on said arm structure.

6. A support arm as claimed in claim 1 having an auxiliary support structure connected to said support member.

7. A support arm as claimed in claim 6 wherein the auxiliary structure comprises an air or vacuum hose, a welding gun, a suction hose or a suction arm.

8. A support arm as claimed in claim 7 wherein the auxiliary structure comprises an air extraction arm.

* * * * *